United States Patent
Verschoor et al.

(10) Patent No.: US 11,093,037 B2
(45) Date of Patent: Aug. 17, 2021

(54) COMPUTER-IMPLEMENTED METHOD, SYSTEM AND COMPUTER PROGRAM PRODUCT FOR SIMULATING THE BEHAVIOUR OF A HAND THAT INTERACTS WITH OBJECTS IN A VIRTUAL ENVIRONMENT

(71) Applicant: UNIVERSIDAD REY JUAN CARLOS, Mostoles (ES)

(72) Inventors: Mickeal Verschoor, Mostoles (ES); Miguel Angel Otaduy Tristran, Mostoles (ES); Daniel Lobo Cuenca, Mostoles (ES)

(73) Assignee: UNIVERSIDAD REY JUAN CARLOS, Mostoles (ES)

( * ) Notice: Subject to any disclaimer, the term of this patent is extended or adjusted under 35 U.S.C. 154(b) by 0 days.

(21) Appl. No.: 16/971,521

(22) PCT Filed: Mar. 13, 2019

(86) PCT No.: PCT/ES2019/070170
§ 371 (c)(1),
(2) Date: Aug. 20, 2020

(87) PCT Pub. No.: WO2019/175460
PCT Pub. Date: Sep. 19, 2019

(65) Prior Publication Data
US 2020/0393899 A1    Dec. 17, 2020

(30) Foreign Application Priority Data
Mar. 15, 2018    (ES) .............................. ES201830260

(51) Int. Cl.
*G06F 3/01*    (2006.01)
*G06F 3/0481*    (2013.01)
(Continued)

(52) U.S. Cl.
CPC ......... *G06F 3/014* (2013.01); *G02B 27/0172* (2013.01); *G06F 3/016* (2013.01);
(Continued)

(58) Field of Classification Search
CPC .......... G06F 3/014; G06F 3/016; G06F 3/017; G06F 3/04815; G02B 27/0172; G06K 9/00355; G06K 9/00375; G06K 9/00671
See application file for complete search history.

(56) References Cited

U.S. PATENT DOCUMENTS

| | | | | |
|---|---|---|---|---|
| 2011/0261083 A1* | 10/2011 | Wilson | ................. | G06F 3/016 345/676 |
| 2012/0157203 A1* | 6/2012 | Latta | .................... | G06T 13/40 463/32 |

(Continued)

OTHER PUBLICATIONS

Hirota et al., "Interaction with virtual object using deformable hand", IEEE Virtual Reality Conference 2016, 2016, pp. 49-56.
(Continued)

*Primary Examiner* — Jitesh Patel
(74) *Attorney, Agent, or Firm* — Lucas & Mercanti, LLP

(57) ABSTRACT

A computer-implemented method for simulating the behavior of a hand interacting with objects in a virtual environment is provided, having acquiring a skeleton of a tracked hand using a hand-tracking device; computing a simulated hand interacting with objects in a virtual environment; establishing a coupling between the skeleton of a simulated hand and the tracked skeleton using coupling energies $(U_{crb})$; establishing an internal energy of the simulated hand that accounts for joint constraints of the skeleton, skeleton-tissue coupling, and nonlinear soft-tissue deformation; establishing frictional contact between the simulated hand and virtual objects using a penalty energy considering relative interpenetration at contact points and a frictional energy considering the deviation between each contact point and its
(Continued)

corresponding sliding anchor point; computing an updated skeleton and tissue of the simulated hand by minimizing the total energy involved.

16 Claims, 6 Drawing Sheets

(51) Int. Cl.
    *G02B 27/01*     (2006.01)
    *G06K 9/00*     (2006.01)

(52) U.S. Cl.
    CPC .......... *G06F 3/017* (2013.01); *G06F 3/04815* (2013.01); *G06K 9/00355* (2013.01); *G06K 9/00375* (2013.01); *G06K 9/00671* (2013.01)

(56) References Cited

U.S. PATENT DOCUMENTS

| | | | | |
|---|---|---|---|---|
| 2014/0104274 A1* | 4/2014 | Hilliges | ................. | G06F 30/20 345/424 |
| 2015/0260990 A1* | 9/2015 | Ueno | ..................... | G06F 1/163 345/419 |
| 2017/0168586 A1* | 6/2017 | Sinha | ................. | G06K 9/00382 |
| 2018/0024635 A1 | 1/2018 | Kaifosh et al. | | |
| 2018/0165864 A1* | 6/2018 | Jin | ........................ | G06F 3/011 |
| 2018/0285636 A1* | 10/2018 | Fei | ..................... | G06K 9/00375 |

OTHER PUBLICATIONS

Schroder et al., "Real-time hand tracking using synergistic inverse kinematics", 2014 International Conference on Robotics and Automation (ICRA), 2014, pp. 5447-5454.

Antonya et al., "Parameter computation of the hand model in virtual grasping", 2014 5th IEEE Conferenc on Cognitive Infocommunications (CogInfoCom), 2014, pp. 173-177.

Kim et al., "Physics-based hand interaction with virtual objects", 2015 IEEE International Conference on Robotics and Automation (ICRA), 2015, pp. 3814-3819.

Barbagli et al., "Simulating human fingers: a Soft Finger Proxy Model and Algorithm", Haptic Interfaces for Virtual Environment and Teleoperator Systems, 2004, pp. 9-7.

Ferre et al., "Haptic Device for Capturing and Simulating Hand Manipulation Rehabillitation", IEEE / ASME Transactions on Mechatronics, 2011, vol. 16, No. 5, pp. 808-815.

Feng et al., "Real-time Deformation Simulation of Hand-Object interaction", Robotics, Automation and Mechatronics (RAM) 2011 IEEE Conference, 2011, pp. 154-157.

International Search Report for Corresponding International Application No. PCT/ES2019/070170 (3 Pages) (dated Jul. 4, 2019).

* cited by examiner

COMPUTER-IMPLEMENTED METHOD, SYSTEM AND COMPUTER PROGRAM PRODUCT FOR SIMULATING THE BEHAVIOUR OF A HAND THAT INTERACTS WITH OBJECTS IN A VIRTUAL ENVIRONMENT

CROSS REFERENCE TO RELATED APPLICATION

This Application is a 371 of PCT/ES2019/070170 filed on Mar. 13, 2019 which, in turn, claimed the priority of Spanish Patent Application No. P201830260 filed on Mar. 15, 2018, both applications are incorporated herein by reference.

FIELD OF THE INVENTION

The present invention is comprised within the field of real-time simulations of the behavior of a human hand interacting with virtual objects.

BACKGROUND OF THE INVENTION

Hands are our principal means for interacting with the world. Due to their importance, it is no surprise that the scientific community has witnessed myriads of methods for tracking, simulation, animation, robotics or touch based on the hand. All these areas could benefit from an off-the-shelf, accurate yet efficient hand simulation model, which could provide robust and smooth interaction.

Throughout the years the simulation of humans and the human skin made a large development towards realism. The first models of human hands were solely based on rigid bodies and provided some form of force feedback to the user and a coupling between an articulated and tracked hand was made ([2]; [19]; [11]). Although grasping of object is possible, due to the absence of a deformable skin, accurate simulation of frictional constraints was not possible.

Simulating a human hand that involves a deformable skin, requires one to simulate all different aspects that ultimately form the human hand. This includes the skeleton, the muscles, tendons and the skin. In those simulations, it is important that each different aspect is coupled properly with all other parts such that a realistic behavior is obtained, which makes the problem very challenging to solve. Depending on the required level-of-detail, various approaches exist. Highly detailed approaches are for example found in [[28], where the hand is simulated in a very high level-of-detail, which includes for example the muscles. Other approaches perform the deformation in a geometric way, but deformations due to physical interactions are often not modeled ([12]; [13]). Other methods use data-driven approaches for modeling the deformation of the hand by learning from examples. Since these methods are not completely physics based, it is difficult to obtain a good deformation while the hand is in contact with an object ([26]; [16]; [14]).

Using detailed hand simulations with deformable skin in interactive and real-time applications requires to make a trade-off between realism and computational costs. To reduce the computational complexity of simulating deformable hands, often only the fingers are simulated. This greatly reduces the complexity of the used model ([1]; [6]; [3]; [31]). Realistic simulations of the human hand incorporate a simulation of the rigid skeleton with a deformable skin connected to the bone structure. Methods that connect a portion of the deformable skin to the skeleton are for example ([10]; [27]; [5]). More detailed approaches also simulate parts of the deformation of the skin, like in [22].

One step further incorporates the simulation of the complete skin that is coupled to the bones in a two-way coupling. This means that forces in the skin will propagate to the bones, and the bones can generate, as a result, forces in the skin. Such approaches greatly improve the realism of deformable hands. The approach of [7] performs the coupling between the bones and the skin in two steps. First the approximate configuration of the skeleton is computed which also takes constraints on the joints into account. Next the configuration of the skin is computed given the configuration of the bones, and the bones are allowed to update the configuration of the skeleton. Contact is also modeled using hard-constraints. Furthermore, the authors introduce a modified version of virtual coupling [4]. Perez et al. ([20]; [25]) investigates the simulation of non-linear skin based on strain-limiting constraints and presents an efficient method for solving this kind of constrained problems [21].

Other related work can be found in [8], in which a detailed high-resolution skin model is simulated, which is deformed by the configuration of the underlying skeleton. In this work, there is no additional simulation of the skeleton, nor a virtual coupling between the tracked hand-configuration and the skin simulation. This results in too large stress and deformations in the skin since the simulation does not constrain the motion of the user's hand, or compensates for this. The work in [15] deforms the skin using a global blending of the skin based on the configuration of the underlying skeleton. Here no physically based simulation for the skeleton and skin is performed. However, on top of this, a local deformation is computed based on the penetration depth of the skin and a grasped object.

It is therefore necessary to find a computer-implemented method that performs a real-time simulation of a human hand which improves the response, realism and stability of the simulation, an at the same time requiring minimal computational cost.

REFERENCES

[1] F. Barbagli, A. Frisoli, K. Salisbury, and M. Bergamasco. Simulating human fingers: a soft finger proxy model and algorithm. In HAPTICS '04. Proceedings. 12th International Symposium on, 2004.

[2] C. W. Borst and A. P. Indugula. Realistic virtual grasping. In Proc. of IEEE Virtual Reality Conference, 2005.

[3] M. Ciocarlie, C. Lackner, and P. Allen. Soft finger model with adaptive contact geometry for grasping and manipulation tasks. In World Haptics Conference, 2007.

[4] J. E. Colgate, M. C. Stanley, and J. M. Brown. Issues in the haptic display of tool use. Proc. of IEEE/RSJ International Conference on Intelligent Robots and Systems, pages pp. 140-145, 1995.

[5] Christian Duriez, Hadrien Courtecuisse, Juan-Pablo de la Plata Alcalde, and Pierre-Jean Bensoussan. Contact skinning. Eurographics conference (short paper), 2008.

[6] A. Frisoli, F. Barbagli, E. Ruffaldi, K. Salisbury, and M. Bergamasco. A limit-curve based soft finger god-object algorithm. In Haptic Interfaces for Virtual Environment and Teleoperator Systems, 14th Symposium on, 2006.

[7] Carlos Garre, Fernando Hernandez, Antonio Gracia, and Miguel A. Otaduy. Interactive simulation of a deformable hand for haptic rendering. In Proc. of World Haptics Conference, 2011.

[8] Koichi Hirota and Kazuyoshi Tagaw. Interaction with virtual object using deformable hand. 2016 IEEE Virtual Reality (VR), 00:49-56, 2016.

[9] G. Irving, J. Teran, and R. Fedkiw. Invertible finite elements for robust simulation of large deformation. Proc. of ACM SIGGRAPH/Eurographics Symposium on Computer Animation, pages 131-140, 2004.

[10] J. Jacobs and B. Froehlich. A soft hand model for physically-based manipulation of virtual objects. In 2011 IEEE Virtual Reality Conference (VR), pages 11-18, March 2011.

[11] J. Jacobs, M. Stengel, and B. Froehlich. A generalized god-object method for plausible finger-based interactions in virtual environments. In 2012 IEEE Symposium on 3D User Interfaces (3DUI), pages 43-51, March 2012.

[12] Paul G. Kry, Doug L. James, and Dinesh K. Pai. Eigenskin: Real time large deformation character skinning in hardware. In ACM SIGGRAPH Symposium on Computer Animation, pages 153-160, July 2002.

[13] Tsuneya Kurihara and Natsuki Miyata. Modeling deformable human hands from medical images. In 2004 ACM SIGGRAPH/Eurographics Symposium on Computer Animation, pages 355-363, July 2004.

[14] Paul G. Kry and Dinesh K. Pai. Interaction capture and synthesis. ACM Transactions on Graphics, 25(3):872-880, July 2006.

[15] Jun-Sik Kim and Jung-Min Park. Physics-based hand interaction with virtual objects. In IEEE International Conference on Robotics and Automation, ICRA 2015, Seattle, Wash., USA, 26-30 May 2015, pages 3814-3819, 2015.

[16] Ying Li, Jiaxin L. Fu, and Nancy S. Pollard. Data-driven grasp synthesis using shape matching and task-based pruning. IEEE Transactions on Visualization and Computer Graphics, 13(4):732-747, July/August 2007.

[17] D. Lobo, M. Sara, c, M. Verschoor, M. Solazzi, A. Frisoli, and M. A. Otaduy. Proxy-based haptic rendering for underactuated haptic devices. In 2017 IEEE World Haptics Conference (WHC), pages 48-53, June 2017.

[18] Matthias Muller and M. Gross. Interactive virtual materials. Proc. of Graphics Interface, 2004.

[19] R. Ott, F. Vexo, and D. Thalmann. Two-handed haptic manipulation for CAD and VR applications. Computer Aided Design & Applications, 7(1), 2010.

[20] Alvaro G. Perez, Gabriel Cirio, Fernando Hernandez, Carlos Garre, and Miguel A. Otaduy. Strain limiting for soft finger contact simulation. In Proc. of IEEE World Haptics Conference, 2013.

[21] Alvaro G. Perez, Gabriel Cirio, Daniel Lobo, Francesco Chinello, Domenico Prattichizzo, and Miguel A. Otaduy. Efficient nonlinear skin simulation for multi-finger tactile rendering. In Proceedings of Haptics Symposium. IEEE, 2016.

[22] M. Pouliquen, Christian Duriez, C. Andriot, A Bernard, L. Chodorge, and Florian Gosselin. Real-time finite element finger pinch grasp simulation. In Eurohaptics Conference, 2005 and Symposium on Haptic Interfaces for Virtual Environment and Teleoperator Systems, 2005. World Haptics 2005. First Joint, pages 323-328, March 2005.

[23] Theodore Papadopoulo and Manolis I. A. Lourakis. Estimating the jacobian of the singular value decomposition: Theory and applications. In European Conference on Computer Vision, 2000.

[24] A. G. Perez, D. Lobo, F. Chinello, G. Cirio, M. Malvezzi, J. S. Martin, D. Prattichizzo, and M. A. Otaduy. Optimization-based wearable tactile rendering. IEEE Transactions on Haptics, 10(2):254-264, April 2017.

[25] Jesus Perez, Alvaro G. Perez, and Miguel A. Otaduy. Simulation of hyper-elastic materials using energy constraints. In Proc. of CEIG, 2013.

[26] Nancy S. Pollard and Victor B. Zordan. Physically based grasping control from example. In 2005 ACM SIGGRAPH/Eurographics Symposium on Computer Animation, pages 311-318, July 2005.

[27] Alec R. Rivers and Doug L. James. FastLSM: Fast lattice shape matching for robust real-time deformation. ACM Transactions on Graphics (Proceedings of SIGGRAPH 2007), 2007.

[28] Shinjiro Sueda, Andrew Kaufman, and Dinesh K. Pai. Musculotendon simulation for hand animation. ACM Trans. Graph., 27(3), August 2008.

[29] F. Sin, Y. Zhu, Y. Li, D. Schroeder, and J. Barbie. Invertible isotropic hyperelasticity using SVD gradients. In ACM SIGGRAPH/Eurographics Symposium on Computer Animation (Posters), 2011.

[30] J. Teran, S. Blemker, V. Ng Thow Hing, and R. Fedkiw. Finite volume methods for the simulation of skeletal muscle. In In SIG-GRAPH/Eurographics symposium on Computer Animation, pages 68-74, 2003.

[31] C. B. Zilles and J. K. Salisbury. A constraint-based god-object method for haptic display. In Intelligent Robots and Systems, IEEE/RSJ International Conference on, volume 3, page 3146, Los Alamitos, Calif., USA, 1995. IEEE Computer Society.

DESCRIPTION OF THE INVENTION

The present invention refers to a computer-implemented method with an efficient soft hand simulation model, achieving natural hand-based interaction that features hand motion smoothly adapting to the tracked user's motion, reacts robustly to contact with objects in a virtual environment, and enables dexterous manipulation of these objects. The hand simulation model integrates an articulated skeleton, nonlinear soft tissue and frictional contact, to provide the realism necessary for natural interaction. Robust and smooth interaction is made possible by simulating in a single energy minimization framework all the mechanical energy exchanges among elements of the hand: coupling between the hand's skeleton and the user's motion, constraints at skeletal joints, nonlinear soft skin deformation, coupling between the hand's skeleton and the soft skin, frictional contact between the skin and virtual objects, and coupling between grasped objects and other virtual objects. All elements of the hand that provide realism and natural interaction are taken into account, while ensuring minimal and bounded computational cost, which is key for smooth and robust interaction. As a result, the proposed method for hand simulation can be connected to diverse input tracking devices, and seamlessly integrated in game engines for fast deployment in VR applications.

A first aspect of the present invention refers to a computer-implemented method for simulating the behavior of a hand interacting with objects in a virtual environment. The method comprises repeatedly acquiring a hand configuration of a tracked hand from data captured by a hand-tracking device, the hand configuration including information for establishing the position and orientation of bones forming a tracked skeleton of the tracked hand; and repeatedly computing a hand configuration of a simulated hand in a hand-simulation interacting with at least one object in a virtual environment, the simulated hand comprising non-linear deformable tissue and an articulated skeleton with joints and bones.

The method also comprises the following steps:
- Establishing a coupling between the skeleton of the simulated hand and the skeleton of the tracked hand using coupling energies between pairs of correspondent bones considering their relative positions and orientations.
- Establishing an internal energy of the simulated hand that accounts for joint constraints of the skeleton, skeleton-tissue coupling, and nonlinear soft-tissue deformation. In particular, the method determines an internal energy of the simulated hand, the internal energy comprising a potential energy associated to the joints of the skeleton, a potential energy associated to the tissue, and an energy function associated to the coupling between the tissue and the skeleton. In particular, the method establishes frictional contact between the simulated hand and at least one object in the hand-simulation using potential energies in the normal and tangential directions between a node of the tissue of the simulated hand and an anchor node on the surface of the at least one object in the hand-simulation.
- Establishing frictional contact between the simulated hand and other objects using a penalty energy considering relative interpenetration at contact points and a frictional energy considering the deviation between each contact point and its corresponding sliding anchor point.
- Repeatedly computing an updated skeleton and tissue of the simulated hand by minimizing the total energy involved.

The step of establishing a coupling between the skeleton of the simulated hand and the tracked skeleton may also comprise the following sub-steps:
- Establishing a coupling between a synchronized copy of the skeleton of the simulated hand and an intermediate skeleton using coupling energies between each pair of correspondent bones.
- Establishing a coupling between the tracked skeleton and the intermediate skeleton using coupling energies between each pair of correspondent bones.
- Establishing a coupling between a synchronized copy of the intermediate skeleton and the skeleton of the simulated hand using coupling energies between each pair of correspondent bones.
- Repeatedly computing an updated intermediate skeleton by minimizing the coupling energies involved. This is particular useful when the computation of an updated intermediate skeleton is performed at a higher rate than the computation of an updated skeleton of the simulated hand.

According to an embodiment, the step of computing a hand configuration of the simulated hand comprises modeling the joints using potential energies to keep the endpoints of the bones that form the joint together and limit the angle of the joint.

In an embodiment, the step of computing a hand configuration of the simulated hand comprises computing the deformation of the tissue using a finite element method, wherein the deformable tissue is described considering a potential energy having a quadratic potential energy density function, and wherein the computational domain is divided into a set of tetrahedral elements.

The step of computing a hand configuration of the simulated hand may comprise establishing a coupling between the skeleton and the tissue of the simulated hand using an energy function between bones in the skeleton and nodes of the tissue corresponding to the intersection of bones and tissue.

The object in the virtual environment may be a rigid body or a flexible body. In the first case, the method comprises establishing a coupling between the object interacting with the simulated hand in the hand-simulation and the correspondent object simulated in the virtual environment using coupling energies considering the difference in position and orientation between pairs of objects, and repeatedly computing an updated object in the hand-simulation by minimizing the coupling energies. When the object is a flexible body, the method comprises establishing a coupling between the object interacting with the simulated hand in the hand-simulation and the correspondent object simulated in the virtual environment using coupling energies considering the difference in state between pairs of objects, and repeatedly computing an updated object in the hand-simulation by minimizing the coupling energies.

The method may also comprise representing on a display device the simulated hand interacting with the at least one object in the virtual environment.

Another aspect of the present invention refers to a system for simulating the behavior of a hand interacting with objects in a virtual environment. The system comprises a data processing device, such as a processor or a computer, configured for carrying out the steps of the computer-implemented method.

The system may also comprise any of the following additional elements:
- The hand-tracking device for repeatedly acquiring the hand configuration of the tracked hand of a user.
- A display device (e.g. a monitor or a head-mounted display) configured for representing the simulated hand interacting with the at least one object in the virtual environment.
- A hand-wearable haptic device (e.g. a glove) configured to apply a haptic feedback response on the tracked hand of a user according to forces computed by the data processing device at contact points of the simulated hand, said forces being generated by the interaction with objects in the virtual environment.

A third aspect of the present invention refers to a computer program product for simulating the behavior of a hand interacting with objects in a virtual environment. The computer program product comprises computer usable program code for, when executed on a processor, performing the steps of the computer-implemented method previously defined.

A fourth aspect of the present invention refers to a computer readable storage medium comprising instructions to cause a processor to carry out the steps of the computer-implemented method previously defined.

The computer-implemented method performs a real-time simulation of the skeleton, skin, contact and coupling energies of a human hand as one big simulation, rather than solving each part separately from the rest, thus significantly improving the stability of the simulation. Especially when the user is grasping virtual objects, a stable simulation of all facets of the virtual hand is of paramount importance. For a stable and realistic coupling of the user's motion and the simulation the procedure of virtual coupling presented in [7] is followed. Instead of modeling joints using hard-constraints on the velocity, energy based soft-constraints are used, which greatly improve the response and stability of the solver. Similarly, contact and friction are modeled through penalty energies, both for contact and friction. Kinetic friction is computed by maintaining friction anchors. When the energy density in the skin exceeds a certain maximum, the strain and deformation are limited using a penalty energy density such that the behavior of non-linear materials can be approximated. Since no hard-constraints are used, the convergence of the method remains predictable, which is required for real-time applications. Besides, the hand simulation can be coupled with other existing simulations and/or virtual environments.

The present hand model can be used to interact with objects in virtual worlds through a mechanical exchange of forces and energies between virtual objects and the hand model. This approach significantly differs from existing solutions in which interactions with the objects and/or environment is possible through some gestures. In such existing solutions, the user makes a gesture with the hand (like closing the hand) and some task is performed with objects nearby. For example, grasping an object by attaching the object on the hand by making the 'closed hand' gesture. However, in the present method a virtual hand follows the movement of the user's hand obtained through some hand tracking method, which captures the position and configuration of the user's hand. If the user closes their hand and some virtual object is between the fingers of the virtual hand, the virtual hand and the virtual object will get in contact. The user is now able to interact with the virtual object as it does with a real object. By further closing or opening the hand, the user can change the amount of force applied to the virtual object. This also changes the friction forces between the virtual object and the finger.

The virtual hand is modeled through conservative energy models for each different aspect of the virtual hand. The virtual hand builds on an articulated hand model that includes the bones and joints in the hand. The skin of the virtual hand is modeled using a nonlinear soft-tissue that is wrapped around the articulated skeleton. Contact between the nonlinear skin and other objects is modeled through penalty energies, which also include frictional energies. To couple the movement of the virtual hand and a tracked instance of the skeleton (obtained by the hand tracking method), conservative energies are used as a function of the positional and angular deviation between the skeleton in the hand and tracked configuration. Coupling with the virtual environment is performed similarly by using conservative energies as a function of the deviation between two instances of the same grasped object. One instance is simulated in the virtual world, the other is simulated in contact with the virtual hand. This enables a stable interaction with objects simulated in the virtual environment, and the (re-)use of existing off-the-shelf physics engines used within virtual environments. All parts of the simulation are simulated using an optimization based implicit Euler method, which searches for an optimal solution that conserves the total energy in the system.

BRIEF DESCRIPTION OF THE DRAWINGS

A series of drawings which aid in better understanding the invention and which are expressly related with an embodiment of said invention, presented as a non-limiting example thereof, are very briefly described below.

DESCRIPTION OF A PREFERRED EMBODIMENT OF THE INVENTION

Figure 1A:
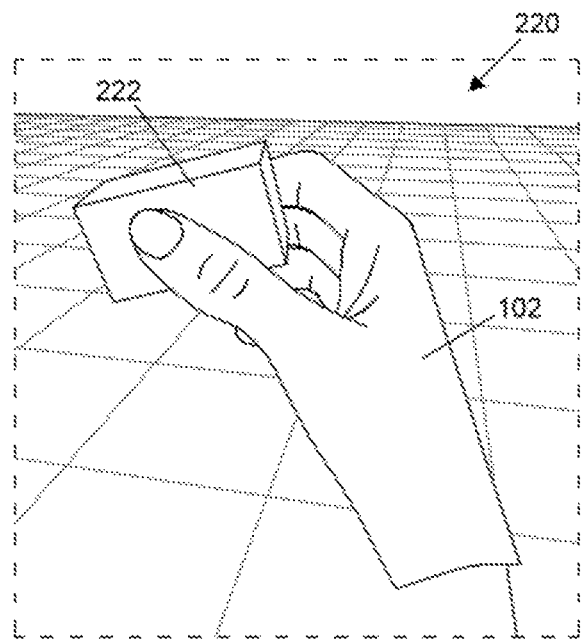
FIGS. 1A and 1B represents two examples of real-time hand-based interaction with an object, according to the computer-implemented method of the present invention.
Figure 1B:
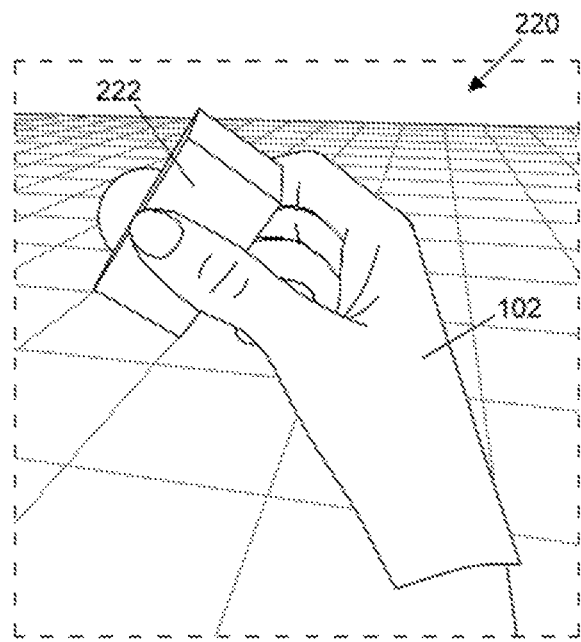

FIGS. 1A and 1B depicts natural and intuitive real-time hand-based interaction. Fine dexterous manipulation is possible thanks to the efficient and robust simulation of a soft hand model. The computer-implemented method performs a simulation of a deformable hand 102 in a virtual environment 220, which is driven by a hand-tracking solution, and is capable to interact with virtual objects 222 that are simulated in the virtual environment 220 with a third-party physics engine.

Figure 2A:
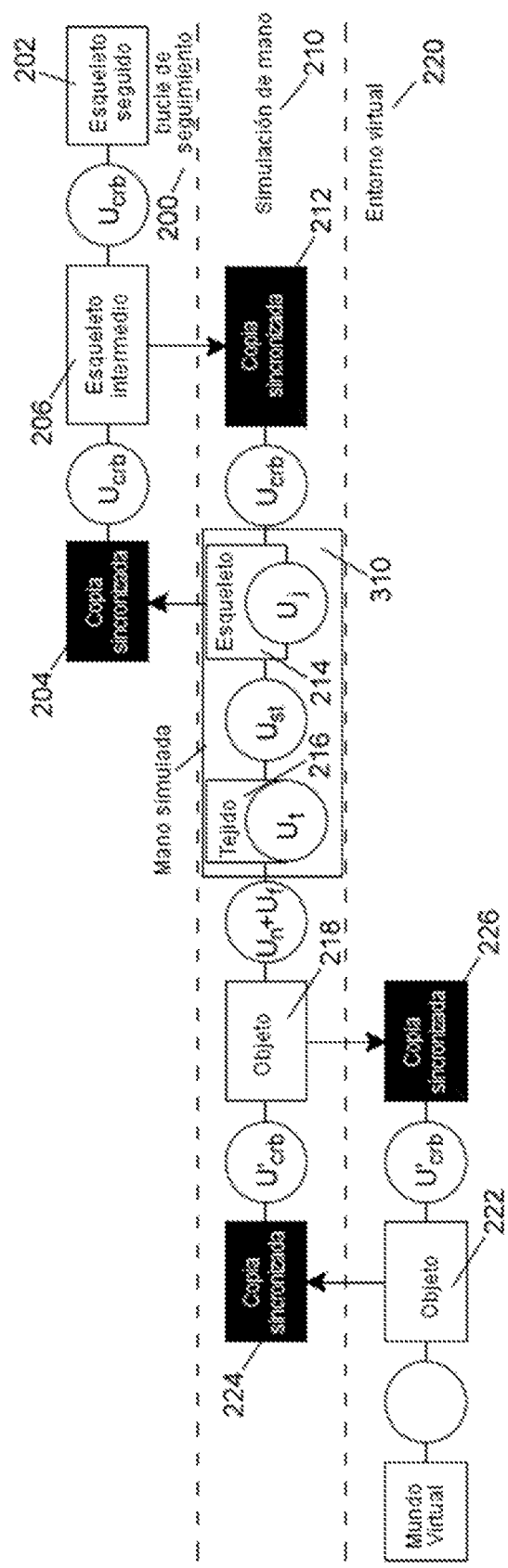
FIGS. 2A and 2B schematically depict, in two different embodiments, the coupling of all parts in the simulation.

FIG. 2A depicts a schematic overview of all individual parts identified in the simulation and shows which parts do interact with each other through the transfer of energy. The black instances are synchronized copies of the corresponding entities (objects, skeleton) and act as static (non-movable) entities in the simulation. When their white counterparts are updated, also the synchronized copy is updated. The simulation involved in the hand-tracking, tracking loop 200, is affected by the tracked skeleton 202 of the tracked hand (retrieved from data captured by the tracker input) and a synchronized copy of the skeleton 204 of the hand simulation 210, while the intermediate skeleton 206 (a virtual, intermediate layer used to couple the hand configuration computed in the hand simulation 210 with the hand configuration captured by the hand-tracking device) is updated at a high simulation-rate. When a new simulation-step in the hand-simulation 210 is initiated, the properties of a synchronized copy of the intermediate skeleton 212 in the hand-simulation 210 are updated and will affect the skeleton 214, tissue 216 and bodies or objects 218 that are in contact. The coupling with the virtual environment 220 (a third-party simulation performed by a physics engine) is performed similarly, except that also velocities and accelerations (forces and torques) are transferred. This is due to a possibly lower simulation-rate.

Figure 2B:
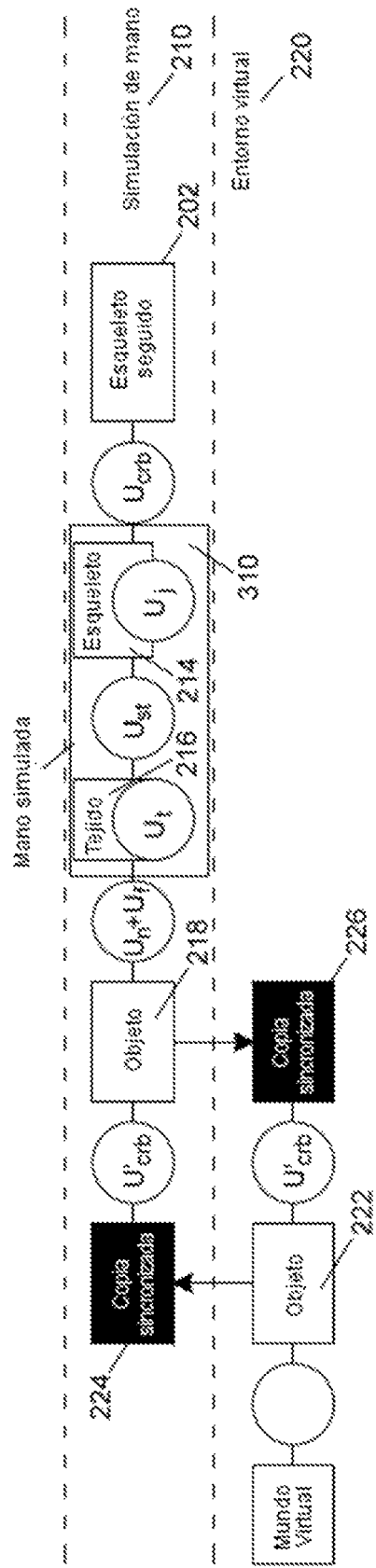

The tracking loop 200 is preferably used when the tracking process to obtain the tracked skeleton 202 is executed at a higher rate than the computation performed in the hand simulation 210 to obtain an updated simulated hand 310. In another embodiment, depicted in FIG. 2B, where the simulation rate to compute the simulated hand 310 is close or equal to the rate in which the tracked skeleton 202 is obtained, the computation of the intermediate skeleton 206 (and therefore also the tracking loop 200) is not strictly necessary.

Figure 3A:
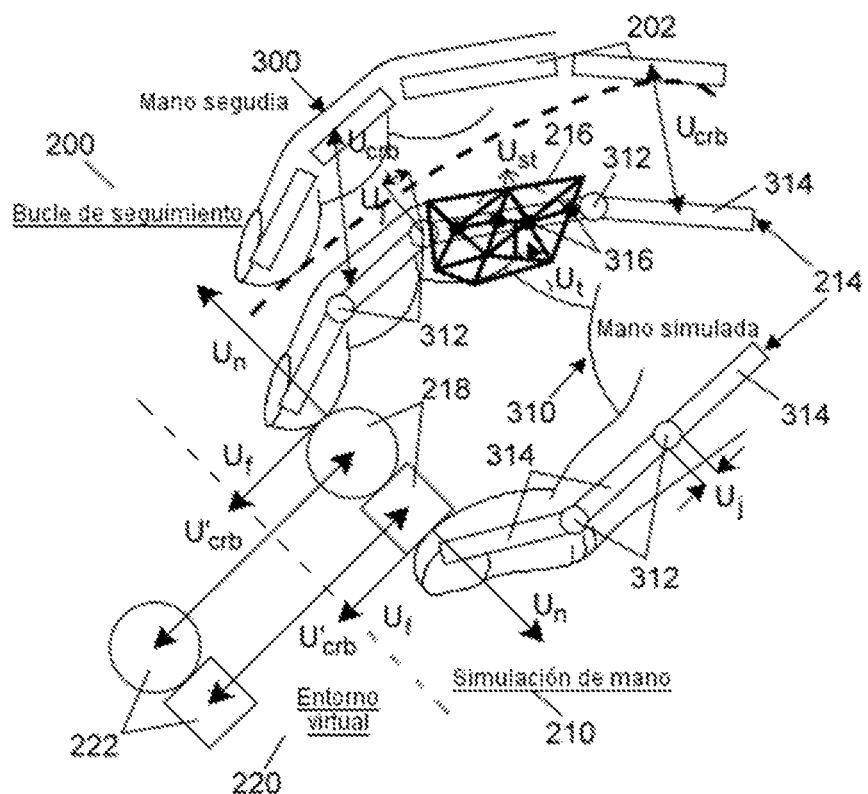
FIGS. 3A and 3B illustrate an overview of the complete model of a hand simulation when interacting with one or two rigid bodies, respectively.
Figure 3B:
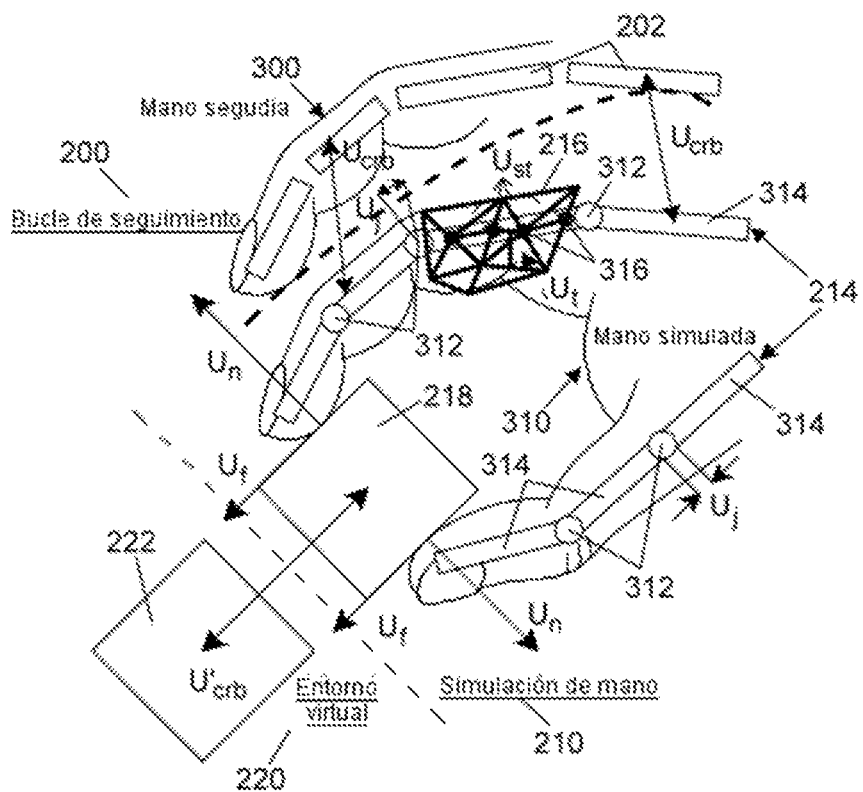

FIG. 3A illustrates an image of the simulated hand 310 and all individual sub-systems involved when interacting with several objects 222, and in particular with two rigid bodies: the tracked skeleton 202 of the user's tracked hand 300, the skeleton 214 and tissue 216 of the simulated hand 310, the touched objects 218 in the hand simulation 210 and the touched objects 222 in the virtual environment 220. FIG. 3B shows another embodiment with the simulated hand 310 interacting with only one object 222, also a rigid body.

The tracked skeleton 202 of the tracked hand 300 represents the tracked configuration obtained by hand-tracker hardware and software, whereas the skeleton 214 of the simulated hand 310 represents the articulated skeleton with joints 312 and bones 314. Joints 312 are modeled using energies $U_j$, which keep the endpoints of the bones 314 together and limits the angle of the joint. Both skeletons (202, 214) are coupled using energies $U_{crb}$ between each pair of bones through an intermediate layer (intermediate skeleton 206). In the simulated hand 310, the tissue 216 (represented as a mesh) is coupled with the articulated skeleton 214 through energies $U_{st}$. Energy $U_t$ represents the energy inside the tissue 216 due to deformations and contact. The simulated hand 310 is in contact with other objects 218. Between the tissue 216 and the objects 218 in contact, friction energy $U_f$ and contact energy $U_n$ are used to couple the tissue 216 with the touched objects 218. The objects 218 in contact in the hand simulation 210 are coupled with the objects 222 in the virtual environment 220 through energy $U_{crb}$ between both objects.

The description of the potential energies between the individual parts will be now explained in detail.

Starting with dynamics, due to conservation of energy in a closed system, the sum of kinetic energies T and potential energies U equals some constant, the total energy in the system:

$$T + U = \text{constant} \tag{1}$$

Alternatively, the Lagrangian L(q, q̇, t) of the system is defined as $$L(q, \dot{q}, t) = T(q, \dot{q}, t) - U(q, \dot{q}, t), \tag{2}$$

with q the generalized coordinates and q̇ the generalized velocities. Using the Euler-Lagrange equation, $$\frac{\partial}{\partial t}\left(\frac{\partial L}{\partial \dot{q}}\right) - \frac{\partial L}{\partial q} = 0, \tag{3}$$

the equations of motion are obtained:

$$\frac{\partial}{\partial t}\left(\frac{\partial T}{\partial \dot{q}}\right) - \frac{\partial T}{\partial q} + \frac{\partial U}{\partial q} = 0. \tag{4}$$

Given the definition of the kinetic energy $T = \frac{1}{2}\dot{q}^T M \dot{q}$, and assuming that the mass is constant over time, equation (4) expands to:

$$\frac{\partial}{\partial t}(M\dot{q}) + \frac{\partial U}{\partial q} = M\ddot{q} + \frac{\partial U}{\partial q} = 0, \tag{5}$$

with M the generalized mass matrix and q̈ the generalized accelerations. To obtain the backward-Euler time discretization, a first-order forward difference approximation of the acceleration q̈ is obtained using:

$$\ddot{q}^{i+1} = \frac{\dot{q}^{i+1} - \dot{q}^i}{\Delta t}, \tag{6}$$

and the generalized velocity q̇ by:

$$\dot{q}^{i+1} = \frac{q^{i+1} - q^i}{\Delta t}. \tag{7}$$

By substituting equation (7) into equation (6), the following approximation for the generalized acceleration is obtained:

$$\ddot{q}^{i+1} = \frac{q^{i+1} - q^i - \Delta t \dot{q}^i}{\Delta t^2}, \tag{8}$$

which can be substituted in equation (5). This gives the following system of equations:

$$M\left(\frac{q^{i+1} - q^i - \Delta t \dot{q}^i}{\Delta t^2}\right) + \frac{\partial U}{\partial q} = 0. \tag{9}$$

From this relation, a function h(x) can be defined, $$h(q) = M\left(\frac{q - q^i - \Delta t \dot{q}^i}{\Delta t^2}\right) + \frac{\partial U}{\partial q} = \frac{\partial E}{\partial q}, \tag{10}$$

which corresponds to the optimality condition of an energy function E(q):

$$E(q) = \frac{\Delta t^2}{2}\dot{q}^T M \dot{q} + U, \tag{11}$$

and q̈ approximated using equation (8) with $q = q^{i+1}$ the unknown generalized positions. Hence, the equations of motion are the gradient of the energy, i.e., $h(q) = \partial E(q)/\partial q$. By minimizing the gradient of the energy for some configuration q, energy is conserved, which can be formalized by:

$$q = \arg\min \|h(q)\|. \tag{12}$$

There exist various alternative approaches for minimizing equation (12). One approach is to perform a first order Taylor-expansion on equation (10) in order to find the unknown $q^{i+1}$ using $$h(q^{i+1}) = h(q^i) + \Delta t \frac{\partial h(q)}{\partial q} \dot{q}^{i+1} = 0,$$

or perform several iterations of Newton's method. In the special case where the derivatives of h(q) are constant, both approaches yield exactly the same procedure. The derivation using Newton's method is hereby used. For a given function f(x), the roots can be found using the following iterative method:

$$x^{z+1} = x^z - \left(\frac{\partial f(x^z)}{\partial x}\right)^{-1} f(x^z), \tag{13}$$

provided that the initial guess of x is close to the actual root. Finding the roots of equation (10) results in the following iterative procedure:

$$q^{z+1} = q^z - \left(\frac{\partial h(q^z)}{\partial q}\right)^{-1} h(q^z), \quad (14)$$

with z the index of the iteration, not to distinguish with the time-step i. The Hessian becomes $$H = \frac{\partial h(q)}{\partial q} = \frac{M}{\Delta t^2} + \frac{\partial^2 U}{\partial q^2}, \quad (15)$$

which is a constant matrix for a quadratic function U. As it will be later explained, potential energy U is quadratic for all defined energies; hence, one iteration of Newton's method minimizes equation (12). Now by using $q^z = q^i$ and $q^{i+1}$, the following derivation is obtained:

$$Hq^{i+1} = Hq^i - h(q^i) \quad (16)$$

$$H(q^{i+1} - q^i) = -M\left(\frac{q^i - q^i - \Delta t \dot{q}^i}{\Delta t^2}\right) - \frac{\partial U}{\partial q}$$

$$\Delta t H \dot{q}^{i+1} = -M\left(\frac{-\Delta t \dot{q}^i}{\Delta t^2}\right) - \frac{\partial U}{\partial q}$$

$$\Delta t \left(\frac{M}{\Delta t^2} + \frac{\partial^2 U}{\partial q^2}\right) \dot{q}^{i+1} = M\left(\frac{\dot{q}^i}{\Delta t}\right) - \frac{\partial U}{\partial q}$$

$$\left(M + \Delta t^2 \frac{\partial^2 U}{\partial q^2}\right) \dot{q}^{i+1} = M \dot{q}^i - \Delta t \frac{\partial U}{\partial q},$$

which can be recognized as an implicit Backward-Euler method. Since the potential energy U only depends on the generalized coordinates, only the Jacobian and Hessian of the potential energy with respect to q are required. Once $\dot{q}^{i+1}$ is obtained, the new generalized positions are obtained by $$q^{i+1} = q^i + \Delta t \dot{q}^{i+1}. \quad (17)$$

As regards elastic tracking, to control a virtual hand by tracking the motion of a real hand, a virtual coupling between the virtual hand and the tracked hand is applied. Applying the motion of the tracked hand directly on the virtual hand seems to be logical, but can result in several issues. If the motion is directly applied to the virtual hand, the amount of forces applied on the grasped objects and the virtual hand can grow rapidly and can become unrealistic. This unrealistic behavior occurs because the real motion of the hand is not limited when the virtual hand is obstructed by some object. Another issue originates from poor tracking results. If the obtained data from the hand-tracker is too noisy or discontinuous, excessive large forces can be computed in the hand model due to the large reported velocities. To solve this, a virtual coupling scheme between the simulated hand 310 and the tracked hand 300 is applied. This virtual coupling absorbs the excessive forces introduced by the hand-tracking. Furthermore, this coupling absorbs the forces that would have been generated by the user's motion. For example, when the user grasps a virtual object using the virtual hand, or when the motion of the virtual hand is obstructed by other (static) virtual objects.

A layered setup is now followed. The tracking of the user's hand-motion is typically performed at a different simulation rate than the simulation of the virtual hand. In order to perform a stable coupling of the hand simulation 210 with the hand tracking method, a separate simulation, tracking loop 200, is preferably performed at a higher simulation rate. This tracking loop 200 takes samples from the tracker data (tracked hand 300) and from the full articulated skeleton 214 in the virtual hand through a synchronized copy 204. In this simulation, the 'target' intermediate skeleton 206 (an intermediate layer of the skeleton) is updated over time, by also taking the coupling between the full skeleton and intermediate skeleton into account. Hence, this virtual coupling scheme can be considered as three layers of skeletons, 1. Tracked configuration of the hand skeleton, tracked skeleton 202, obtained by a hand tracker.
2. Intermediate skeleton 206.
3. Full articulated skeleton 214 containing bones 314 and joints 312 in the hand.

First, the hand-tracker sets the position and orientations of the bones in the first layer, and can be coupled to the second layer directly using the following energy function:

$$U_{crb} = \tfrac{1}{2} k_l \|x_a - x_b\|^2 + \tfrac{1}{2} k_a \|\Delta \theta e_{ab}\|^2 \quad (18)$$

with x the positions of the intermediate bone a and tracked bone configuration b and $\Delta\theta e_{ab}$ their difference in their axis angle orientations. Furthermore, since the tracked bone configuration is provided, only these energies are minimized for the intermediate bones, while keeping the values of the tracked configurations constant during the simulation-step. When minimizing this energy function, the configuration of the intermediate bones will follow the motion of the tracked configuration.

The coupling between the intermediate layer (intermediate skeleton 206) and the full articulated skeleton 214 is slightly different. Since the tracking and coupling is performed using a much higher update rate than the full hand-simulation, each simulation simulates its own instance of the skeleton. To couple these instances to the intermediate layer, equation (18) is used. First, a synchronized copy 204 of the full skeleton 214 in the hand simulation 210 is coupled with the intermediate skeleton 206 using equation (18) for which the positions and orientations of the skeleton in the hand configuration are kept constant. This allows to change the positions and orientations in the intermediate skeleton 206. Second, a similar coupling is made between a synchronized copy 212 of the intermediate skeleton 206 and the full skeleton 214 in the hand model. Now the positions and orientations of the intermediate skeleton are kept constant, while the full skeleton 214 (and so the full-hand) can be updated. Minimizing these energies allows updates of the intermediate skeleton 206 given the coupling energies of the tracked configuration and the hand simulation 210. Furthermore, changes in the energy between the intermediate layer and the hand skeleton results in updates of the configuration of the virtual hand in an asynchronous way. Since the minimization of the energies between the tracked skeleton 202, intermediate skeleton 206 and a synchronized copy 204 of the hand skeleton 214 runs at a higher update rate, stability is guaranteed. Furthermore, the computed energies and corresponding forces can be used to drive external haptic devices.

The virtual hand-model consists of different combined simulations for which different energy functions can be defined and added to the system described in equation (16). The hand model consists of an articulated body skeleton 214, deformable skin (tissue 216), a coupling between the skeleton and skin, and contact between other objects 218 and the virtual hand.

The bones 314 and joints 312 form a skeleton 214 which is an articulated rigid-body simulation that forms the third layer in the virtual coupling. The kinetic energy T for the rigid-bodies is computed by $$T = \frac{1}{2} v_c^T M v_c + \frac{1}{2} \omega^T I \omega, \tag{19}$$

with $v_c$ the velocity of the center of mass, $\omega$ the angular velocity and I the moment of inertia. The joints 312 between the rigid bodies define a potential energy $U_j$ between two rigid bodies. For a spherical joint this potential energy $U_j$ can be described as follows:

$$U_j = \frac{1}{2} k \|x_{ca} + r_a - x_{cb} - r_b\|^2, \tag{20}$$

which defines a potential between the two endpoints of the bones 314 that form the joint 312. Positions $x_{ca}$ and $x_{cb}$ describe the positions of the centers of mass of both bones a and b. Vectors $r_a$ and $r_b$ are the vectors from the centers of mass to the endpoints of the bones 314 that are used in the joint 312. Depending on the type of joint, additional energies can be defined to constrain the relative motion between the bodies in a particular axis.

On top of this articulated body simulation (skeleton 214), a Finite Element Method simulation is used to simulate the deformation of the skin (tissue 216). Since the deformation of the skin is non-linear, a strain limiting method/material is used to mimic the behavior of the human skin. In the first stage of the deformation, the stiffness is relatively low, small forces result in large deformation. While the deformation increases, the stiffness of the skin increases, resulting in less deformation and increasing stress in the skin. Due to this, the skin is able to generate larger forces on objects.

The potential energy $U_t$ for a deformable body can be described by $$U_t = \int_{106} W(F(q)) dq, \tag{21}$$

with W the potential energy density at a point q inside the material and F the deformation gradient. For a quadratic potential energy density function W, a linear elasticity model can be obtained easily. By dividing the computational domain into a number of tetrahedral elements, W can be approximated per element. In order to limit the strain, W will be scaled once a certain threshold energy density $W_{max}$ is reached. For example:

$$W = W_q + \frac{1}{2} k_c \left( \frac{W_q}{W_{max}} - 1 \right)^2, \tag{22}$$

with $W_q$ the current energy density, $W_{max}$ the energy threshold and $k_c$ an additional penalty energy density. Energy density $W_q$ can be originating from any linear constitutive model for elasticity.

The following Finite Element Method (FEM) may be used. Given a particular energy density function W, the first Piola-Kirchhoff stress tensor P(F) can be obtained through the derivative of the energy density function w.r.t. the deformation gradient F, i.e., $$P(F) = \frac{\partial W(F)}{\partial F}. \tag{23}$$

The deformation gradient F for a particular tetrahedral element relates the initial configuration $D_m$ with the current configuration $D_s$, i.e., $D_s = F D_m$, such that $F = D_s D_m^{-1}$. Both $D_s$ and $D_m$ contain 4 column vectors with the current and initial coordinates of all vertices of the elements, where the 4-th component contains a one ([30]).

Similar as for Cauchy stress, a stress vector is obtained by $$T = P(F) n, \tag{24}$$

with n the surface normal of the cross-sectional area. By discretizing the interior of an object using tetrahedral elements, the stress vectors for each surface element of each tetrahedral element can be computed. The force generated by this stress depends on the areas of these surface elements. Per cross-sectional area, a corresponding force can be computed that contributes to each of the three nodes of the surface element. Therefore, the total force on a particular node of the tetrahedron is the sum of the adjacent cross-sectional stress, divided by three, i.e, $$\frac{\partial U_t}{\partial q} = f_i = -\frac{P(F)(A_1 n_1 + A_2 n_2 + A_3 n_3)}{3} = -P(F) b_i, \tag{25}$$

with $A_i n_i$ the area-weighted normal of a face incident to vertex i. For a tetrahedral element, node i is only shared by 3 faces of the same element. The force derivative is computed as:

$$\frac{\partial^2 U_t}{\partial q^2} = \frac{\partial f}{\partial q} = \frac{\partial f}{\partial F} \frac{\partial F}{\partial q} = \left( -\frac{\partial P(F)}{\partial F} b_i \right) \frac{\partial F}{\partial q}. \tag{26}$$

Since the force and force derivatives depend on the Jacobian and Hessian of the energy density function W, we derive them for the case when the energy density exceeds the threshold. The Jacobian and Hessian of this modified energy density function in equation (22) becomes:

$$\frac{\partial W}{\partial F} = \frac{\partial W_q}{\partial F} \left( 1 + \frac{k_c}{W_{max}} \left( \frac{W_q}{W_{max}} - 1 \right) \right), \tag{27}$$

$$\frac{\partial^2 W}{\partial F^2} = \frac{\partial^2 W_q}{\partial F^2} \left( 1 + \left( \frac{k_c}{W_{max}} \right) \left( \frac{W_q}{W_{max}} - 1 \right) \right) + \frac{k_c}{W_{max}^2} \left( \frac{\partial W_q}{\partial F} \right) \left( \frac{\partial W_q}{\partial F} \right)^T. \tag{28}$$

Due to the increased energy density, the strain and so the deformation will be reduced.

The deformation gradient F contains the rotation, deformation and possible reflections (inversions) of each element, where the energy density function W should be rotational invariant for isotropic materials. To separate the rotation from the deformation a Polar Decomposition or Singular Value Decomposition (SVD) can be used. A popular approach is the co-rotational FEM method (18). Co-rotational FEM performs the stress computations in an unrotated frame by rotating the displacement into the unrotated frame. Given the unrotated displacement the stress and forces are computed in the unrotated frame. Finally, the result is rotated back into the rotated frame of the displacement. The co-rotational method can be summarized by:

$$f = -R_e K R_e^T q + R_e K q_0, \tag{29}$$

with K the element stiffness matrix and $R_e$ the rotation of the element obtained through a Polar Decomposition. Since $q_0$ is already in the unrotated frame, no correction is applied for $q_0$. In case of linear elasticity, K remains constant throughout the simulation.

Alternatively, since the derivatives of the energy density function are not constant for the strain limiting approach, we follow the description of the forces as described in the previous paragraph. Using the SVD the deformation gradient can be decomposed through $F=U\hat{F}V^T$, with $\hat{F}$ a diagonal matrix containing the singular values of the deformation gradient and U and $V^T$ two rotation matrices. Since the energy density function W is rotational invariant for isotropic materials, the First Piola-Kirchhoff stress can be computed by $$P(F) = UP(\hat{F})V^T = U\frac{\partial W(\hat{F})}{\partial \hat{F}}V^T. \tag{30}$$

Since $\hat{F}$ is a diagonal matrix containing the deformations $\lambda_1, \lambda_2, \lambda_3$ in the three principal axis, the computation of $W_q$ and its Jacobian and Hessian now becomes straightforward. When the determinant of the deformation gradient is negative, the element is inverted. In order to handle such an inversion, the rotation matrices U, $V^T$ and diagonal matrix $\hat{F}$ needs to be corrected such that the rotation matrices are free from any reflection, see (9). When large deformations are to be expected, also the derivatives of the rotations need to be included, which require the derivatives of the SVD, see (23) and (29).

With regards the skeleton-tissue coupling, the FEM simulation is coupled to the underlying articulated body simulation by defining an energy function between the tissue 216 and the rigid bodies in the skeleton 214. Each node 316 that belongs to an element in the tetrahedralization that is intersected by a rigid bone 214, is attached to that bone 214 using the following energy:

$$U_{st} = \tfrac{1}{2}k\|x_c + R_b r_{cn} - \Sigma_{i=1}^4 w_i x_i\|^2, \tag{31}$$

with $x_c$ the center of mass of the rigid body, $R_b$ the orientation of the body and vector $r_{cn}$ the vector from the center of mass to the interpolated position $x_e = \Sigma_{i=1}^4 w_i x_i$ of the coupled element in its rest configuration. By minimizing this energy, the motion and external forces applied on the skeleton will affect the skin and forces in the skin will affect the motion of the skeleton. This eventually results in a deviation in the virtual coupling.

Figure 4A:
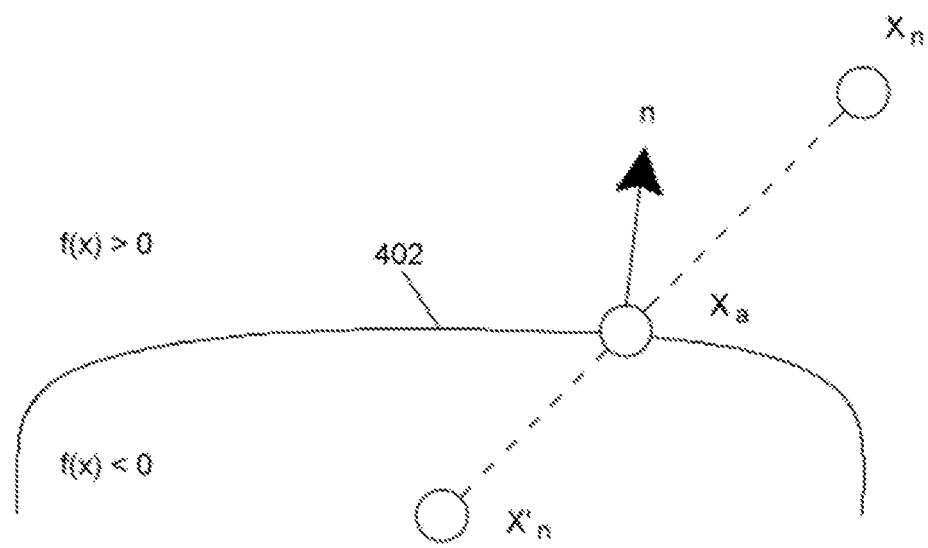
FIG. 4A depicts the configuration at first impact between the skin of the virtual hand and an object.

Contact between the virtual hand and another object is modeled using a penalty energy between nodes in the virtual hand and an anchor node that lies on the surface of the body. When a particular node of the skin tissue 216, a vertex $x_n$, penetrates the surface of an object 218, its signed distance $f(x)$ with reference to the surface of the body becomes negative. When this happens, there exists a configuration of both the object 218 and the vertex $x_n$ between the current and previous time-step, where $x_n$ lies exactly on the surface of the body. At this location, an anchor node $x_a$ is initialized and the contact normal n is sampled, as shown in FIG. 4A. Given the anchor node $x_a$ and the vertex $x_n$, a potential energy can be defined. Here we distinguish between normal and tangential energies. When a node of the skin is in contact with a body, the potential energy $U_n$ in the normal direction becomes:

$$U_n = \tfrac{1}{2}k_c w\|nn^T(x_a - x_n)\|^2, \tag{32}$$

with $x_a$ the position of the anchor node on the surface of the object 218, n the contact normal, $k_c$ the contact stiffness and w a weighting value.

Similarly a tangential and bi-normal energies can be defined by replacing the normals n with the tangent vector $t_1$ or bi-normal vector $t_2$. Vectors $t_1$ and $t_2$ are both perpendicular to n and to each other. Furthermore, $t_1$ points from the anchor node $x_a$ into the direction of $x_n$.

FIG. 4A depicts the contact model used for the interaction between the tissue 216 and the object 218. A vertex $x_n$ of the skin penetrates the object (distance $f(x) < 0$) at $x_n'$. Next, the intersection of the path of vertex $x_n$ with the surface 402 of the object 218 is computed. At the point of intersection, an anchor node $x_a$ is initialized and the contact normal $$n = \frac{\nabla f(x)}{\|\nabla f(x)\|}$$

is computed. The anchor is maintained while the vertex is in contact with the surface.

Figure 4B:
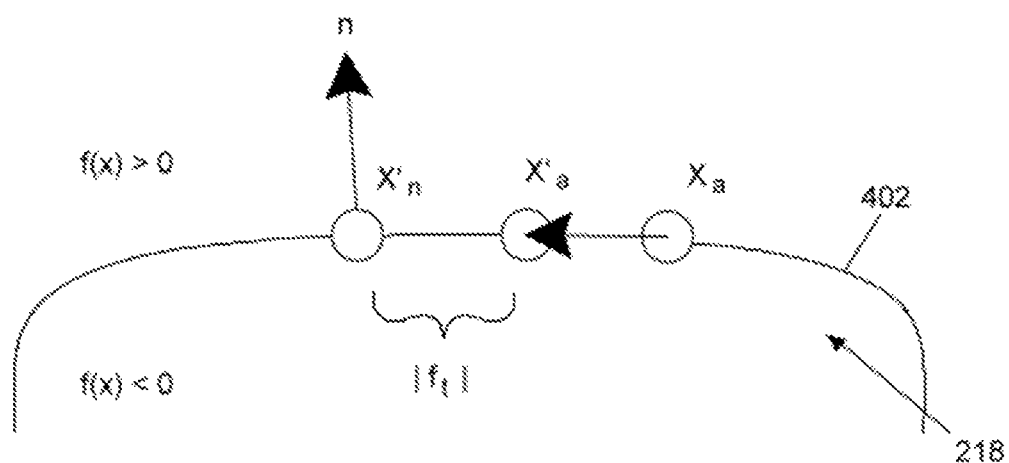
FIG. 4B shows an update of the anchor node when kinetic friction applies.

The energy model just described minimizes the distance between the anchor $x_a$ and the node in contact when static friction applies, i.e., when both surfaces do not slide over each other. To determine if static or kinetic friction should apply, Coulombs friction model is approximated. When the force in the tangential direction $f_t$ is larger than the force in the normal direction $f_n$ times the friction coefficient $\mu$, kinetic friction should be applied, i.e., $\|f_t\| > \mu\|f_n\|$, with $f_n = -\partial U_n/\partial q$. In this case, the tangential force is clamped by the normal force times 1.2 such that kinetic friction applies, i.e., the surfaces are allowed to slide over each other, as depicted in FIG. 4B. If kinetic friction applies, anchor $x_a$ is allowed to slide over the surface 402. Given the normal force, anchor $x_a$ is moved towards $x_n$ such that the corresponding friction force respects Coulomb's friction model.

To clamp the energy and force in the tangential direction, first the magnitude of the friction force is clamped according to Coulomb's model for friction. Next, the anchor point should be moved over the surface 402 of the object 218 in to the direction of the sliding velocity. The displacement should be chosen such that the magnitude of the friction force in the next time-step approximately satisfies Coulomb's law, i.e., $\|f_t\| \approx \mu\|f_n\|$. The tangential potential energy $U_f$ in case of kinetic friction then becomes:

$$U_f = \tfrac{1}{2}k_c w\mu\|tt^T(x_c + r_a - x_n)\|^2. \tag{33}$$

By updating the position of the anchor, a portion of the potential energy is removed from the system. This energy is converted into thermal energy, which is not modeled in the present simulation.

In order to determine if static friction should be applied, the magnitude of the tangential friction force should be compared against the normal contact-force times the friction coefficient. If $\|f_t\| < \mu\|f_n\|$, static friction should be applied and the anchor is not allowed to slide over the surface.

Objects in the virtual world can interact with each other and with the virtual environment. These objects are usually simulated using a physics engine (virtual environment 220) that takes care of these interactions and applies the laws of motion to these objects. In order to consider the interaction between the simulated hand 310 and the objects, a coupling with the virtual world must be applied, similarly to the virtual coupling used between the hand-tracker and the simulated hand. In this case, each object exists in both simulations, one in the virtual environment 220 and one that is simulated together with the virtual hand in the hand simulation 210. If the object is rigid, the coupling energy is $U'_{crb}$, described in equation (18), but takes the object from both simulators (object a from hand simulation 210 and object b from virtual environment 220). If the object is flexible, the coupling energy is proportional to the Euclidean norm of the difference between the states of objects a and b. The coupling energy minimizes the difference between both instances of the objects (218, 222). This energy term is applied to each object in both simulators. When minimizing these energies, one pair of state representations is kept constant since they are not computed by the same simulator (using the synchronized copies 224 and 226 in FIG. 2).

In order to deliver a stable simulation of the complete hand model, all individual aspects of the simulation are solved together using a large system of equations. This includes the bones 314 and joints 312 in the articulated skeleton 214, the FEM simulation of the skin 216, additional bodies, coupling between the skin 216 and bones 314, coupling of the objects and their representation in the virtual world, and the contact between the skin and the objects. To obtain this global system, the Jacobians and Hessians of the potential energies with respect to q need to be computed for each defined energy. Here q contains the positions of the skin nodes and the state of all bodies. Furthermore, the derivatives of the kinetic energies must be computed and stored in the same system, see equation (4).

This large system is solved for the unknown generalized velocities q, which are applied later, see equation (17). Such a large system allows to correctly perform an implicit time stepping scheme, which increases the accuracy and stability of the simulation. FIG. 2 shows how the individual energy terms are coupled.

Figure 5:
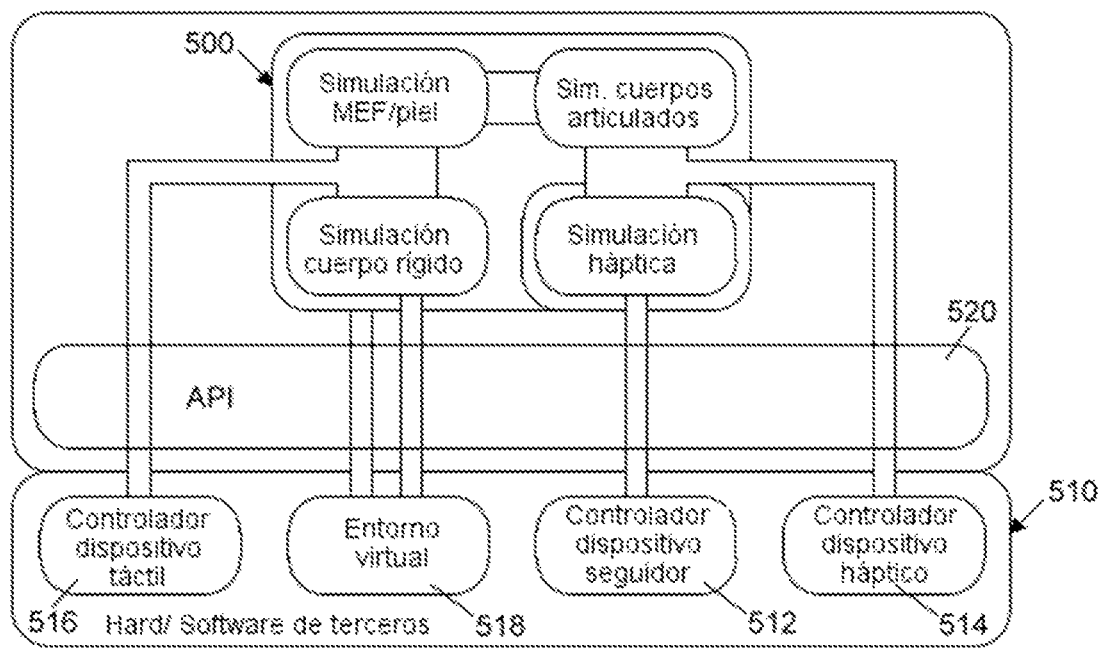
FIG. 5 shows a schematic overview of the hand simulation as a library for integration with third-party tools.

As mentioned before, one major advantage of the present method is that it enables seamless integration with off-the-shelf physics engines. Building on this feature, the present hand simulation method has been encapsulated within a library that simplifies the integration with other modules. In particular, the library constitutes an asset of a game engine, and the soft hand model can be added to a virtual environment through a simple drag-and-drop operation. FIG. 5 shows a brief overview of the simulation library 500 with different modules.

The simulation library 500 is a modular library for hand simulations which allows an easy integration with third-party tools 510 (hardware and/or software), and in particular with different types of tracking devices 512. Besides, the library 500 can be used to drive various types of haptics devices 512 and tactile devices 516 through specific drivers or modules. The library 500 also provides an interface for third-party simulation environments 518, like Unity or Unreal Engine, to share information about the state of physics objects that are allowed to interact with the present hand simulation. Furthermore, these virtual environments 518 are used to visualize the state of the simulated hand. Due to the modular setup, customized drivers can be developed for a certain hardware, also allowing for an easy integration with existing software.

The main module of the library 500 is invoked by third-party physics/game engines. It allows the user to load specific drivers for various haptics 514 and tactile devices 516 and for various types of motion tracking devices 512. The user is also able to create modules for custom devices using a SDK (Software Development Kit). The main module contains the simulation of the hand and is solely performed by the main module. It does not use the host physics engine. For each type of supported physics/game engine, host objects/classes are provided which are used by the user to interact with the library. These host objects are responsible for invoking the library, providing it with additional information about the environment simulated in the host physics engine. The host object is also responsible for visualizing the state of the simulation performed in the simulation library and providing the virtual environment with additional responses which interact with the objects defined in the host physics engine.

Tracking modules are used to generalize various hand/motion tracking methods, e.g., Kinect, LeapMotion, OptiTrack or other methods. Each module is responsible for acquiring the positions and orientations of the fingers and the hand position, transforming the data in the proper format and feeding the simulation of the hand with proper motions.

Haptic rendering modules are used to drive haptic devices 514. The API 520 provides the driver with information about the tracked position and orientation of the bones, and the current position and orientation of the simulated bones. Furthermore, all forces and torques computed by the coupling between the tracked and simulated bones are provided. Given this information and some device specific information, the driver can compute response forces or actuator positions in order to provide the end-user a realistic haptic feedback through the device.

Tactile rendering modules provide an interface to tactile rendering devices 516. Tactile devices provide the end-user with tactile feedback of the objects touched in the virtual world. For each finger in the simulation, tactile information can be provided by the generated collision events. Based on this information, the module can compute a response force or motion for the device.

In order to control the various types of modules, each with a different set of parameters, the user can send messages through a main interface. The library 500 distributes the message to all loaded modules such that they can be configured and/or controlled directly. For example, for specific types of haptics devices one must first enable a few motors in order to be functional.

Figure 6:
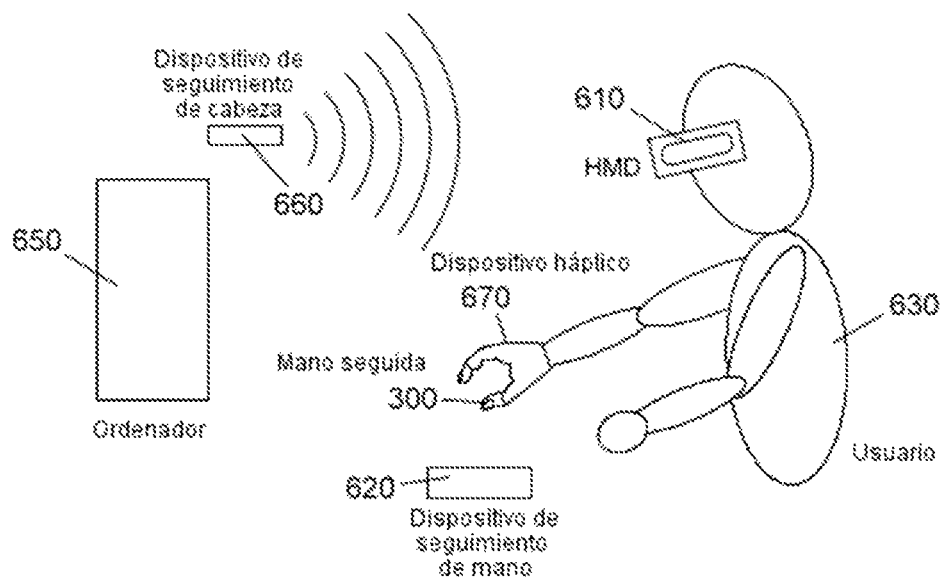
FIG. 6 depicts an embodiment of the hardware setup used to run a hand simulation.

FIG. 6 shows an embodiment of a hardware setup used to run a simulation and perform interactions with virtual objects in a virtual environment displayed through a head-mounted display 610 (HMD). The simulation takes as input a hand configuration, tracked hand 300, obtained by a hand tracker or hand-tracking device 620, such as a Leap Motion controller, through some hand-tracking method. The hand-tracking device 620 may be attached to the head-mounted display 610 in order to increase the workspace of the user 630.

Depending on the tracking method, a vast variety of cameras can be used to track the motion of the user's hand. For example, stereo depth cameras or standard depth cameras can be used. The hand tracking method detects the position and shape of the user's hand and the present hand simulation method acquires the hand configuration by retrieving this information from the hand-tracking device 620 (using the tracker device driver 512 of FIG. 5). For instance, if a Leap Motion controller is employed as hand-tracking device 620, the configuration of the user's hand iscaptured byusing a stereo depth camera and reconstructing the bone configuration of the captured images.

The complete simulation is performed on a data processing device, such as a computer 650 or a laptop using a multi-core CPU. The visualization of the virtual environment is performed using an off-the-shelf game engine and the GPU to visualize the hand simulation in the HMD 610 and perform the simulation of the objects in the game engine. The hand simulation may be implemented in a plug-in created for a game engine (e.g. Unreal Engine 4, Unity). Each game engine is able to interact with the hand-simulation through the interface that the plug-in provides. Furthermore, the game engine can provide the hand simulation with additional information about the objects that are created by the game engine.

The visualization of the hand simulation may be performed on any display device, such as a monitor, a TV or a head-mounted display 610. Game engines can support the use of a head-mounted display for displaying the virtual world in an immersive way to the user. The head-mounted display 610 may be equipped additional sensors for obtaining the orientation, acceleration and position of the head-mounted display. A head-tracking device 660 may be used to capture the position of the head-mounted display 610 (such as in Oculus Rift or HTC Vive headsets).

The hand-tracking device 620 may be attached to the head-mounted display 610 and the information of these sensors transferred to the hand simulation. The sensors of the hand-tracking device 620 may only report positions and orientations relative to the camera. By also considering the data from the head-mounted display sensors, the absolute position of the tracked hand 300 and its configuration can be reconstructed, significantly increasing the workspace of the user. In the default setup, the camera of the Leap Motion controller 620 is placed in front of the user on a flat surface, but the position and orientation of the camera can be anywhere in the virtual and real world.

Since the library computes the forces in the elastic coupling and contact forces between the hand and touched object in the virtual environment, the library can compute feedback forces for different kind of haptic and tactile devices, such as a hand-wearable haptic device 670 (e.g. a glove). For the experiments shown in [17], a hybrid haptics and tracking device driverwas created that compute a response force forthe used exoskeleton, and uses the sensors in the exoskeleton for acquiring the configuration of the fingers. Furthermore, tactile device drivers are implemented for driving the devices described in [24] using the methods described in that document.

The described hand simulation and coupling method allow the user to use their hands to interact with the virtual world in a physically correct way. Forces that are computed when the virtual hand is in contact with virtual objects or forces computed in the virtual coupling, can be used to drive external devices for haptic and tactile feedback. Thanks to the coupling method and the way the simulation of the virtual hand is set up, a very robust interaction method is obtained that prevents the user to interact with the virtual world in a nonphysical way. Using a non-linear deformation model, the behavior of the virtual skin mimics the behavior of a real skin tissue.

In the setup shown in FIG. 6, the user wears an HMD on which the hand tracker is attached. The head tracker keeps track of the position of the HMD and hand tracker. The sensor, HMD and hand tracker are connected to a high-end computer (CPU+GPU). When the simulation is running, the HMD displays the virtual environment to the user and the display of the virtual world responds to the motion of the user. When the hand tracker detects the hand of the user, the position of the hand relative to the hand tracker is obtained. Given this position and the position and orientation of the HMD, the simulated hand is displayed (to the user) relative to the HMD. When the user sees a virtual object through the HMD, the user is able to move its hand closer to the virtual object. When the virtual hand is close enough to the virtual object, the user can interact with the virtual object using its own hand. Alternatively, the hand tracker can be set at a fixed position near the user (for example, on a table in front of the user).

The invention claimed is:

1. A computer-implemented method for simulating the behavior of a hand interacting with objects in a virtual environment, the method comprising:
   repeatedly acquiring a hand configuration of a tracked hand from data captured by a hand-tracking device, the hand configuration including information for establishing the position and orientation of bones forming a tracked skeleton of the tracked hand;
   repeatedly computing a hand configuration of a simulated hand in a hand-simulation interacting with at least one object in a virtual environment, the simulated hand comprising non-linear deformable tissue and an articulated skeleton with joints and bones;
   establishing a coupling between the skeleton of the simulated hand and the tracked skeleton using coupling energies ($U_{crb}$) between pairs of correspondent bones considering their relative positions and orientations,
   determining an internal energy of the simulated hand, the internal energy comprising a potential energy ($U_j$) associated to the joints of the skeleton, a potential energy ($U_t$) associated to the tissue, and an energy function ($U_{st}$) associated to the coupling between the tissue and the skeleton;
   establishing frictional contact between the simulated hand and at least one object in the hand-simulation using potential energies in the normal ($U_n$) and tangential ($U_f$) directions between a node ($x_n$) of the tissue of the simulated hand and an anchor node ($x_a$) on the surface of the at least one object in the hand-simulation; and
   repeatedly computing an updated skeleton and tissue of the simulated hand by minimizing the total energy ($U_{crb}$, $U_j$, $U_t$, $U_{st}$, $U_n$, $U_f$) involved.

2. The computer-implemented method of claim 1, wherein the step of establishing a coupling between the skeleton of the simulated hand and the tracked skeleton comprises:
   establishing a coupling between a synchronized copy of the skeleton of the simulated hand and an intermediate skeleton using coupling energies ($U_{crb}$) between each pair of correspondent bones;
   establishing a coupling between the tracked skeleton and the intermediate skeleton using coupling energies ($U_{crb}$) between each pair of corresponding bones;
   establishing a coupling between a synchronized copy of the intermediate skeleton and the skeleton of the simulated hand using coupling energies ($U_{crb}$) between each pair of correspondent bones;
   repeatedly computing an updated intermediate skeleton by minimizing the coupling energies ($U_{crb}$) involved.

3. The computer-implemented method of claim 2, wherein the computation of an updated intermediate skeleton is performed at a higher rate than the computation of an updated skeleton of the simulated hand.

4. The computer-implemented method according to claim 1, wherein the step of computing a hand configuration of the simulated hand comprises modeling the joints using potential energies ($U_j$) to keep the endpoints of the bones that form the joint together and limit the angle of the joint.

5. The computer-implemented method according to claim 1, wherein the step of computing a hand configuration of the simulated hand comprises computing the deformation of the tissue using a finite element method, wherein the deformable tissue is described considering a potential energy ($U_t$) having a quadratic potential energy density function W, and wherein the computational domain is divided into a set of tetrahedral elements.

6. The computer-implemented method according to claim 1, wherein the step of computing a hand configuration of the simulated hand comprises establishing a coupling between the skeleton and the tissue of the simulated hand using an energy function ($U_{st}$) between bones in the skeleton and nodes of the tissue corresponding to the intersection of bones and tissue.

7. The computer-implemented method according to claim 1, wherein the at least one object is a rigid body, the method further comprising:
   establishing a coupling between the at least one object interacting with the simulated hand in the hand-simulation and the correspondent object simulated in the virtual environment using coupling energies ($U'_{crb}$) considering the difference in position and orientation between pairs of objects, and
   repeatedly computing at least one updated object in the hand-simulation by minimizing the coupling energies ($U'_{crb}$).

8. The computer-implemented method according to claim 1, wherein the at least one object is a flexible body, the method further comprising:
   establishing a coupling between the at least one object interacting with the simulated hand in the hand-simulation and the correspondent object simulated in the virtual environment using coupling energies considering the difference in state between pairs of objects, and
   repeatedly computing at least one updated object in the hand-simulation by minimizing the coupling energies.

9. The computer-implemented method according to claim 1, comprising representing on a display device the simulated hand interacting with the at least one object in the virtual environment.

10. A system for simulating the behavior of a hand interacting with objects in a virtual environment, comprising a data processing device configured to:
    repeatedly acquiring a hand configuration of a tracked hand from data captured by a hand-tracking device, the hand configuration including information for establishing the position and orientation of bones forming a tracked skeleton of the tracked hand;
    repeatedly computing a hand configuration of a simulated hand in a hand-simulation interacting with at least one object in a virtual environment, the simulated hand comprising non-linear deformable tissue and an articulated skeleton with joints and bones;
    establishing a coupling between the skeleton of the simulated hand and the tracked skeleton using coupling energies ($U_{crb}$) between pairs of correspondent bones considering their relative positions and orientations,
    determining an internal energy of the simulated hand, the internal energy comprising a potential energy ($U_j$) associated to the joints of the skeleton, a potential energy ($U_t$) associated to the tissue, and an energy function ($U_{st}$) associated to the coupling between the tissue and the skeleton;
    establishing frictional contact between the simulated hand and at least one object in the hand-simulation using potential energies in the normal ($U_n$) and tangential ($U_f$) directions between a node ($x_n$) of the tissue of the simulated hand and an anchor node ($x_a$) on the surface of the at least one object in the hand-simulation; and
    repeatedly computing an updated skeleton and tissue of the simulated hand by minimizing the total energy ($U_{crb}$, $U_j$, $U_t$, $U_{st}$, $U_n$, $U_f$) involved.

11. The system of claim 10, comprising the hand-tracking device for repeatedly acquiring the hand configuration of the tracked hand of a user.

12. The system according to claim 10, comprising a display device configured for representing the simulated hand interacting with the at least one object in the virtual environment.

13. The system of claim 11, wherein the display device is a head-mounted display.

14. The system according to claim 10, wherein the data processing device is configured to compute forces at contact points of the simulated hand generated by the interaction with objects in the virtual environment, the system further comprising a hand-wearable haptic device configured to apply a haptic feedback response on the tracked hand of a user according to the computed forces.

15. A computer program product for simulating the behavior of a hand interacting with objects in a virtual environment, characterized by comprising computer usable program code for, when executed on a processor, performing the steps of the computer-implemented method defined in claim 1.

16. A non-transitory computer readable medium comprising executable programming instructions stored thereon that cause a processor to carry out the steps of the computer-implemented method defined in claim 1.

* * * * *